United States Patent [19]
Kobayashi

[11] 3,971,258
[45] July 27, 1976

[54] FEED MECHANISM FOR A MACHINE TOOL

[75] Inventor: Akiyoshi Kobayashi, Kariya, Japan

[73] Assignee: Toyoda Koki Kabushiki Kaisha, Japan

[22] Filed: Feb. 26, 1975

[21] Appl. No.: 553,272

[30] Foreign Application Priority Data
Mar. 4, 1974 Japan.............................. 49-25553

[52] U.S. Cl................................. 74/10.2; 74/526; 74/625; 192/93 C; 192/95
[51] Int. Cl.² ......................................... G05G 5/04
[58] Field of Search..................... 74/10.2, 526, 625; 192/93 C, 95

[56] References Cited
UNITED STATES PATENTS

| | | | |
|---|---|---|---|
| 2,527,458 | 10/1950 | Schurr | 192/95 X |
| 2,780,941 | 2/1957 | Kollmorgen | 74/10.2 |
| 3,012,447 | 12/1961 | Wallace | 74/10.2 X |
| 3,176,107 | 3/1965 | Temple | 74/526 X |
| 3,247,732 | 4/1966 | Barnhart | 74/10.2 X |
| 3,397,592 | 8/1968 | Muller | 192/95 X |

FOREIGN PATENTS OR APPLICATIONS

| | | | |
|---|---|---|---|
| 1,014,614 | 8/1957 | Germany | 74/526 |
| 1,030,385 | 5/1958 | Germany | 74/526 |

*Primary Examiner*—Allan D. Herrmann
*Attorney, Agent, or Firm*—Oblon, Fisher, Spivak, McClelland & Maier

[57] ABSTRACT

A feed mechanism for a machine tool having an improved stop mechanism which includes a movable stop, a stationary stop, and a rotatable control member. The stationary stop is located on a rotational path of the movable stop which is freely rotatable about a handle shaft. The control member, which can be rotated together with the handle shaft, is adapted to rotate the movable stop together therewith except through a predetermined angular extent, such that the handle shaft for feeding a movable unit of the machine tool may be rotatable more than the movable stop by the predetermined rotational extent.

8 Claims, 2 Drawing Figures

FEED MECHANISM FOR A MACHINE TOOL

BACKGROUND OF THE INVENTION

1. Field of the Invention

The present invention relates generally to a feed mechanism for a machine tool such as a grinding machine, and more particularly to a feed mechanism associated with an improved stop device having a movable stop.

2. Description of the Prior Art

Heretofore, in feed mechanisms of this type, for the reason that an automatic feed amount is restrained by the interference between a movable stop rotatable together with a manual feed handle and a stationary stop, a defect appears in that an automatic maximum feed amount is obtained at less than one revolution of the feed handle even if the feed stroke of a hydraulic actuator for turning the feed handle is adequate. In another mechanism of the type in which the stroke of an actuator for turning a feed handle is manually adjusted, the enlarging of the feed amount is attainable, but the manual adjustment is quite troublesome.

Still another mechanism, for obtaining a large feed amount, is devised such that a stop is slidable to a rotational path of a movable stop in synchronism with the rotation of a feed handle so as to limit the feed end. However, the mechanism requires gear and chain synchronous mechanisms which are complicated in construction, whereby the handling of the feed handle is spoiled and, whereby it is also difficult to precisely adjust the feed amount. The mechanism is moreover not capable of obtaining a smooth feed movement due to the intervention of the chain synchronous mechanism.

SUMMARY OF THE INVENTION

It is therefore an object of the invention to provide an improved feed mechanism for a machine tool, which is associated with a unique stop mechanism for enlarging an automatic feed amount.

Another object of the invention is to provide a feed mechanism of the above type, in which the relative rotation between a rotational shaft and a movable stop is permitted by a predetermined rotational extent for the enlargement of the feed amount.

A further object of the invention is to provide a feed mechanism of the above type, which is optimized in coordination with a manual feed handle.

An additional object of the invention is to provide a feed mechanism of the above type, in which the adjustment of the feed amount is not only easy, but the mechanical strength is also adequate to maintain stop accuracy at high grade irrespective of minimum size construction.

Briefly, the foregoing and other objects are attained by a feed mechanism according to the present invention, which includes a rotatable shaft, drive means, a rotational control member, a movable stop, and a stationary stop. The shaft is provided to move a movable unit of the machine tool when rotated by the drive means. The control member, which is rotated integrally with the rotatable shaft, is adapted to restrain the rotation of the movable stop except through a predetermined rotational extent. Therefore, even when the movable stop is stopped by interference with the stationary stop, the control member may be further rotated through the extent, that is defined to be more than the sum of widths of the above stops if one or more revolution of the shaft is required.

In accordance with other aspects of the invention, such a construction is coordinated with adjusting means which serve to adjust a relative position between the shaft and the control member, such that the feed amount of the movable unit can be changeable in compliance with the necessity. Additionally, the above construction is further coordinated with a feed handle mechanism, whereby the movable unit may also be driven selectively in automatic or manual modes.

BRIEF DESCRIPTION OF THE DRAWING

Other objects, features, and attendant advantages of the invention are more fully appreciated from the following detailed description when considered in connection with the accompanying drawing, in which.

DETAILED DESCRIPTION OF THE PREFERRED EMBODIMENT

Figures 1, 2:
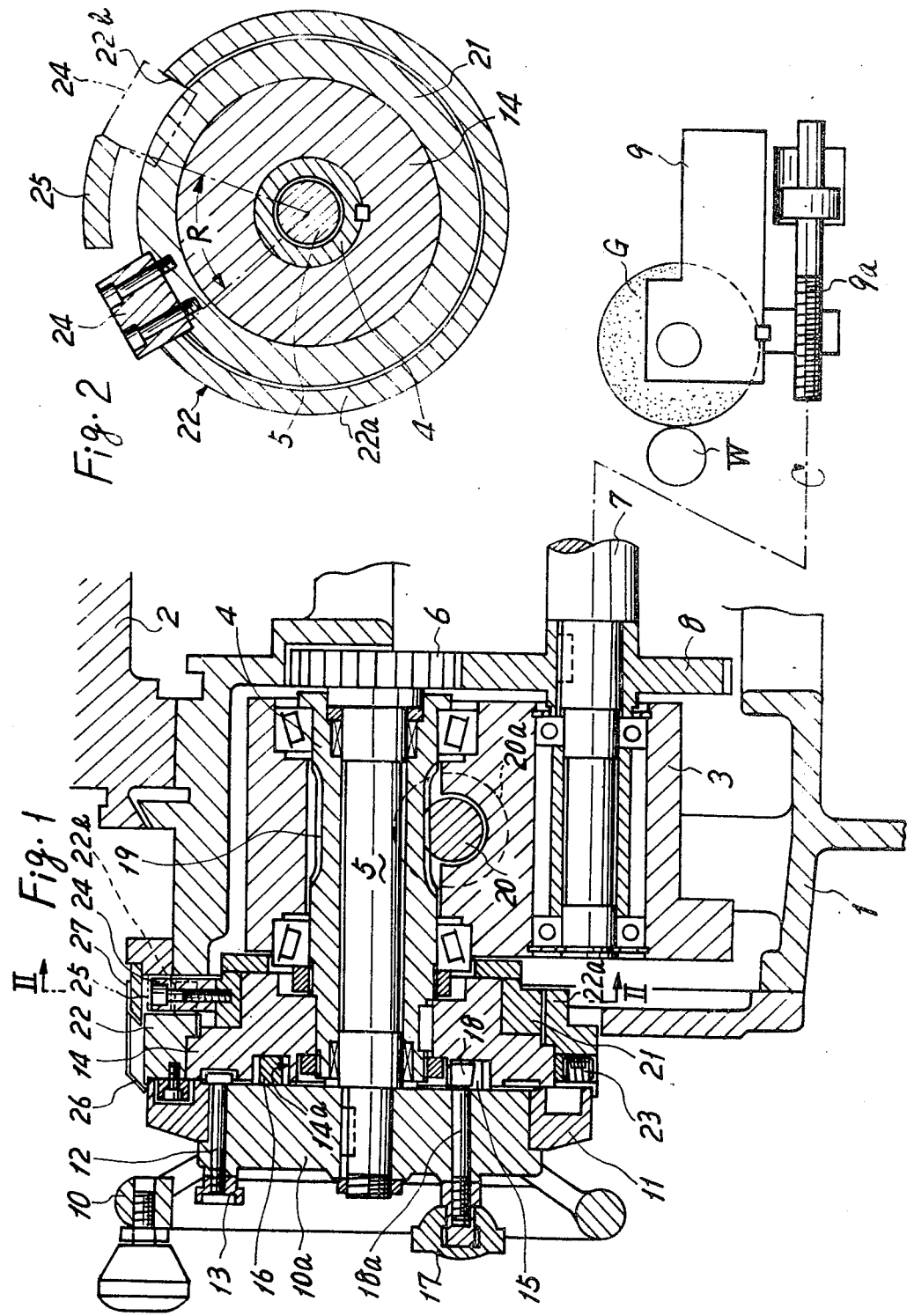
FIG. 1 is a longitudinal sectional view of a feed mechanism constituted in accordance with the present invention.
FIG. 2 is a longitudinal sectional view, taken along line II—II of FIG. 1, especially showing the arrangement between stops.

Referring now to the drawing, wherein like reference characters designate the same parts throughout the several views, and particularly to FIG. 1, a bed 1 of a grinding machine is shown having slidably mounted thereon a table 2 with a workpiece W to be ground respectively supported thereon. On a support member 3, which is fixedly mounted on the bed 1, a gear sleeve 4 is rotatably mounted, by which a handle shaft 5 is in turn rotatably mounted in axial alignment therewith. A drive gear 6 is formed on one end of the handle shaft 5 and is meshed with a driven gear 8 which is fixed on a transmitting shaft 7. In this connection, rotation of the transmitting shaft 7 can cause a feed screw shaft 9a to be rotated, such that a movable unit or wheel head 9 may be movable toward and away from the workpiece W.

The handle body 10a of a manual feed handle 10 is keyed on the other end of the handle shaft 5, and is secured by means of a bolt-nut connection. A scale ring 11 is rotatably supported on the outer periphery of the handle body 10a and is adapted to be secured at a desired position by means of a bolt 12 and a releasable nut 13 through a pinching force created in the thrust direction by the same. A clutch member 14 is keyed on the periphery of the gear sleeve 4 in face to face relationship with the handle body 10a and is formed at the facing side, with an annular groove 14a, within which a resilient clutch ring 16, provided with a slit portion 15, is retained. In the slit portion 15 is positioned a wedge-shaped boss 18 of a drawing bolt 18a which is held so as to be axially operated by a manual switch knob 17. Thus, when the wedge-shaped boss 18 is axially drawn toward the left, as shown in FIG. 1, the clutch ring 16 is expanded in the radial direction with the result that the handle body 10a may be integrally connected with the clutch member 14.

A pinion 19 is formed on the periphery of the gear sleeve 4 and is meshingly engaged with a rack-piston 20 of a hydraulic actuator 20a which constitutes a part of an automatic feed mechanism. Accordingly, when pressurized fluid is supplied into the actuator 20a, rotational movement is given to the gear sleeve 4 through the pinion 19 by the sliding of the rack-piston 20 and is further transmitted to the handle shaft 5 through the clutch member 14 and the handle body 10a.

A rotational ring 21 bears on the periphery of the clutch member 14 so as to be relatively rotatable and an adjusting ring 22 for presetting the feed amount is also rotationally mounted so as to be adjusted to a desired angular position and to be secured at such position to the clutch member 14 by means of a tightening bolt 23. The adjusting ring 22 is provided, at a cylindrical protruded portion 22a which surrounds and covers the periphery of the rotational ring 21, with a cut-out portion 22b as best shown in FIG. 2, within which a movable stop 24 is fixed on the rotational ring 21 so as to always be dwelling. Fixedly provided on the rotational path of the movable stop 24 and also on the support member 3, is a stationary stop 25, which is to be contacted by the movable stop 24 and which is out of interference with the cylindrical protruded portion 22a.

In addition, an extent of the cut-out portion 22b which dominates the feed amount is determined to be more than the sum of a width of the stationary stop 25 and double widths of the movable stop 24 in this preferred embodiment wherein a feed amount corresponding to more than one revolution (but less than two) of the handle shaft 5 is desirable. This is not to be considered a limitation of the present invention. It should therefore be noted that the movable stop 24 is, except for a predetermined rotational extent R indicated in FIG. 2, regulated by and rotated along with the adjusting ring 22 acting as a rotational control member.

The operations of the feed mechanism, so constructed, are described hereinbelow. In a manual feed mode, by switching off the switch knob 17, the handle body 10a is released from engagement with the clutch member 14. The wheel head 9, which has been beforehand in the retracted position, is then rapidly advanced toward the workpiece W by operation of a hydraulic actuator, not numbered. At the advanced end, when the feed handle 10 is manually rotated, the rotation is transmitted to the handle shaft 5 and further to the feed screw shaft 9a through the drive gear 6, the driven gear 8, and the transmitting shaft 7, whereby the wheel head 9 is manually fed. During such feed, the workpiece may be ground to a finish size as a result of the wheel head position depending upon visual observation on the scale ring 11.

Alternatively, in an automatic feed mode, the wheel head 9 is first advanced to the most advanced position to grind the workpiece W to a finish size, by rotation of the feed handle 10 after the completion of advanced operations of the hydraulic actuator for rapid feed and the other actuator 20a. In such a condition, the adjusting ring 22 is manually rotated relatively to the clutch member 14, in taking into consideration predetermined automatic feed amount, and is secured to the clutch member 14 at a desired angular position by means of the tightening bolt 23. Furthermore, by switching on the switch knob 17, with the result of outwardly expanding the clutch ring 16, the handle body 10a is integrally connected with the clutch member 14. Thereafter, when the above actuators are reversely operated, the reverse rotation of the handle shaft 5 is terminated in the situation where the movable stop 24 interferes with the right end of the stationary stop 25, as indicated by the phantom line in FIG. 2. Then, when a push button switch (not shown) is pushed after a new workpiece is supported by a workpiece mounting device (not shown), an automatic grinding operation is initiated.

The wheel head is rapidly advanced, and from the advance end the rack-piston 20 of the actuator 20a is slowly moved at a predetermined grinding feed rate. Thus, the gear sleeve 4, the clutch member 14, the handle body 10a and the handle shaft 5 are turned as if one body, and the rotation is thereby given to the feed screw shaft 9a through the transmitting shaft 7, such that the automatic feed of the wheel head 9 may be carried out. Although the adjusting ring 22 is at this time turned in a clockwise direction as viewed in FIG. 2, the cylindrical protruded portion 22a thereof is passed to the inside of the stationary stop 25 without interference with the same. The protruded portion 22a engages the left end portion of the movable stop 24 as it rotates in the clockwise direction and once engaged the protruded portion 22a and the movable stop 24 rotate together.

Therefore, it will be appreciated that the adjusting ring 22 and the feed handle 10 are able to be turned an additional amount equal to a predetermined angular extent R and they are also rotatable within approximately two revolutions if the width of the cut-out portion 22b is extended as wide as possible. The automatic grinding feed is completed when the rack-piston 20 slides to the slide end in the advance direction. The slide end can accurately define the advanced end of the automatic grinding feed. For the purpose of a sparkout grinding operation, the wheel head 9 dwells at the advanced end for a while until a time switch means (not shown) switches over, and after that is rapidly retracted to the retracted position.

It is incidentally described that in FIG. 1, reference numerals 26 and 27 designate pointers respectively for the scale ring 11 and the adjusting ring 22, the latter of which is also formed with a graduation for the automatic feed amount on the periphery thereof.

Obviously, many modifications and variations of this invention are possible in light of these teachings. It is to be understood therefore that within the scope of the appended claims, the present invention may be practiced otherwise than as specifically described herein.

What is claimed as new and intended to be covered by Letters Patent is:

1. A feed mechanism for a machine tool comprising:
   a shaft rotatable for supplying a feed movement to a movable unit of said machine tool in a machining operation;
   drive means capable of reversibly turning said shaft;
   a ring member rotatable together with said shaft and provided with a cut-out portion;
   a movable stop rotatable in axial alignment with said ring member and engaged within said cut-out portion for permitting a relative rotation therebetween through a predetermined rotational extent; and
   a stationary stop fixedly provided on the rotational path of said movable stop for restraining one end of said ring member by interference with said movable stop, said predetermined rotational extent being defined to be more than the sum of widths of said movable stop and said stationary stop so that said shaft may be turned within a range of less than two revolutions.

2. A feed mechanism as set forth in claim 1, wherein a width of said cut-out portion in the rotational direction is determined as being more than the sum of a width of said stationary stop and double widths of said movable stop.

3. A feed mechanism as set forth in claim 1, wherein said shaft and ring member are in axial alignment with each other, and further comprising:
   a cylindrical member rotatable about said shaft for rotating said shaft by said drive means through the rotation thereof; and
   a locking means for releasably locking said ring member to said cylindrical member at a desired position in the rotational direction in order to determine the feed amount of said movable unit.

4. A feed mechanism as set forth in claim 3, wherein said ring member rotatably bears on said cylindrical member, and further comprising:
   a support ring rotatably supported on said cylindrical member for attaching said movable stop thereon in such a manner that the same is extended through said cut-out portion onto a circular locus including said stationary stop.

5. A feed mechanism as set forth in claim 4, further comprising:
   a feed handle fixed on one end of said shaft for rotating the same in a manual operation mode;
   a connecting member interposed between said cylindrical member and said feed handle; and
   switching means for operating said connecting member so as to connect said feed handle with said cylindrical member such that said shaft may be rotated by the medium of said cylindrical member and said feed handle in an automatic operation mode.

6. A feed mechanism as set forth in claim 5, wherein said connecting member is a resilient annular member disposed within an annular groove formed between said cylindrical member and said feed handle for connection through a frictional engagement in any angular position therebetween.

7. A feed mechanism as set forth in claim 5, wherein said drive means comprises a hydraulic actuator whose piston-rod is operably engaged with said cylindrical member through rack-pinion meshing means.

8. A feed mechanism as set forth in claim 7, wherein an advanced end of said unit is limited by one slide end of a piston disposed within said hydraulic actuator, and a retracted end thereof is limited by interference between said movable stop, said ring member, and said stationary stop.

* * * * *